(12) United States Patent
Gallimore et al.

(10) Patent No.: US 9,651,092 B2
(45) Date of Patent: May 16, 2017

(54) BEARING ARRANGEMENT

(71) Applicant: ROLLS-ROYCE PLC, London (GB)

(72) Inventors: Stephen Gallimore, Lincoln (GB); John Richard Webster, Derby (GB)

(73) Assignee: ROLLS-ROYCE plc, London (GB)

( * ) Notice: Subject to any disclaimer, the term of this patent is extended or adjusted under 35 U.S.C. 154(b) by 59 days.

(21) Appl. No.: 14/631,180

(22) Filed: Feb. 25, 2015

(65) Prior Publication Data
US 2015/0267745 A1    Sep. 24, 2015

(30) Foreign Application Priority Data

Mar. 19, 2014 (GB) .................................. 1404875.5

(51) Int. Cl.
| | |
|---|---|
| *F16C 33/66* | (2006.01) |
| *F16C 39/04* | (2006.01) |
| *F16C 19/54* | (2006.01) |
| *F16C 25/08* | (2006.01) |
| *F16C 41/02* | (2006.01) |

(Continued)

(52) U.S. Cl.
CPC .............. *F16C 39/04* (2013.01); *F16C 19/54* (2013.01); *F16C 19/547* (2013.01); *F16C 25/08* (2013.01); *F16C 41/02* (2013.01); *F16C 19/16* (2013.01); *F16C 33/586* (2013.01)

(58) Field of Classification Search
CPC ...... F16C 19/18; F16C 19/181; F16C 19/182; F16C 19/522; F16C 19/54; F16C 19/547; F16C 25/06; F16C 25/08; F16C 33/586; F16C 39/04; F16C 41/00; F16C 41/005; F02C 7/06; F04D 29/04; F04D 29/046; F04D 29/049; F04D 29/05; F04D 29/051; F04D 29/059
USPC ........................................................ 384/556
See application file for complete search history.

(56) References Cited

U.S. PATENT DOCUMENTS

| | | | |
|---|---|---|---|
| 3,580,649 A | * | 5/1971 | Araki ...................... F16C 19/54 384/606 |
| 3,721,161 A | | 3/1973 | Bobst |
| 4,309,144 A | | 1/1982 | Eggmann et al. |

(Continued)

FOREIGN PATENT DOCUMENTS

| | | |
|---|---|---|
| DE | 101 26 103 A1 | 3/2002 |
| DE | 103 46 647 A1 | 5/2005 |

(Continued)

OTHER PUBLICATIONS

Nov. 24, 2015 Search Report issued in European Patent Application No. 15 15 6323.

(Continued)

*Primary Examiner* — James Pilkington
(74) *Attorney, Agent, or Firm* — Oliff PLC

(57) ABSTRACT

A bearing arrangement includes: first and second thrust bearings, arranged on a shaft and including respective first and second pressure faces; and a hydraulic connection, connecting the first and second thrust bearings and having a non-compressible fluid. Applying a shaft thrust load axially moves the first thrust bearing so that the first pressure face displaces the non-compressible fluid from the first thrust bearing to the second thrust bearing so as to apply a reaction force to the second pressure face, in order that the thrust load is shared between the first and second thrust bearings.

9 Claims, 4 Drawing Sheets

(51) Int. Cl.
*F16C 33/58* (2006.01)
*F16C 19/16* (2006.01)

(56) References Cited

U.S. PATENT DOCUMENTS

| | | |
|---|---|---|
| 4,983,050 A | 1/1991 | Aida |
| 6,082,907 A * | 7/2000 | Arvidsson ............... F16C 19/54 384/556 |
| 2009/0103849 A1 | 4/2009 | Maguire |
| 2010/0078177 A1 | 4/2010 | Parmeter et al. |
| 2013/0129504 A1 | 5/2013 | Heldner |

FOREIGN PATENT DOCUMENTS

| | | |
|---|---|---|
| EP | 0339601 A1 | 11/1989 |
| EP | 2050925 A2 | 4/2009 |
| EP | 2050932 A2 | 4/2009 |
| EP | 2194238 A1 | 6/2010 |
| GB | 1344318 A | 1/1974 |
| GB | 1 458 660 A | 12/1976 |

OTHER PUBLICATIONS

Oct. 20, 2014 Search Report issued in British Application No. GB1404875.5.

\* cited by examiner

BEARING ARRANGEMENT

BACKGROUND

The present invention relates to a bearing arrangement, in particular a load sharing bearing arrangement.

Rotating shafts, such as those used in gas turbine engines, typically require bearings to support relatively moving or rotating components. Where light weight and minimum power loss from friction are required, roller element bearings are common and may be used to react both radial and thrust loads.

SUMMARY

Since single bearings inevitably have a limited thrust capability, two or more bearings may be arranged adjacent one another to share the thrust load. In these so-called "stacked" bearing arrangements, small variations (of the order of a few microns in some cases) in the geometry of the sets of rolling elements or bearing races between the bearings can lead to one bearing taking more of the load than the other(s). Furthermore, under-loading of one set of rolling elements may result in "skidding" of that set, which may cause damage, debris release and bearing failure. For these reasons, the geometry of the rolling elements and bearing races of the different bearings needs to be carefully controlled and matched so that the load may be shared (ideally equally) between the bearings. This requirement to precision-engineer and match bearings in pairs (or other multiples) incurs costs in the manufacturing and supply chain.

Furthermore, the materials of the rolling elements and/or bearing races may expand in use due to heating, which can exacerbate further the geometrical variations and lead to a "runaway" effect in which one bearing takes progressively more of the load, potentially resulting in bearing failure. This may occur even if matched bearings are selected and installed because even very small geometrical variations between the bearings may be magnified under the severe environmental operating conditions in gas turbine engines.

In addition, it is difficult or even impossible for the engine operator to determine the loads imposed on the bearings in operation, leading to uncertainty with regard to service life and maintenance schedules.

It is an object of the invention to alleviate the problems of the prior art at least to some extent.

The invention is set out in the accompanying claims.

According to an aspect, there is provided a bearing arrangement, comprising: first and second thrust bearings, arranged on a shaft and including respective first and second pressure faces; and a hydraulic connection, connecting the first and second thrust bearings and comprising a non-compressible fluid; wherein applying a shaft thrust load axially moves the first thrust bearing so that the first pressure face displaces the non-compressible fluid from the first thrust bearing to the second thrust bearing so as to apply a reaction force to the second pressure face, in order that the thrust load is shared between the first and second thrust bearings.

The hydraulic connection enables the axial thrust load to be shared between the first and second thrust bearings, such that geometrical variations and/or differential expansions between the thrust bearings may be tolerated. Hence, the requirement for careful control and matching of bearings is eliminated, or at least relaxed.

The non-compressible fluid may comprise a gel, a grease, or a liquid, for example an oil.

The hydraulic connection may comprise first and second cavity spaces between the respective first and second thrust bearings and a surrounding component, the first and second cavity spaces being coincident with the respective first and second pressure faces and connected to one another, optionally by a passage which extends through outer races of the first and second thrust bearings.

The first and second cavity spaces may be bounded by resilient elements of the surrounding component, the resilient elements being arranged to allow axial displacement of the thrust bearings in order to share the thrust load between the thrust bearings in the event of a failure of the hydraulic connection.

The first and second pressure faces may have substantially the same surface area such that the thrust load is substantially equally shared between the first and second thrust bearings. Or, the first and second pressure faces may have substantially different surface area such that the thrust load is unequally shared between the first and second thrust bearings.

The bearing arrangement may include a sensor arranged to detect the pressure of the non-compressible fluid.

The first and second thrust bearings may be axially spaced on the shaft. A spacer element may be disposed between the first and second thrust bearings to define the axial distance there between.

The bearing arrangement may comprise three or more hydraulically-connected thrust bearings. The thrust bearings may be ball bearings, tapered cylindrical roller bearings, hydrostatic bearings, or hydrodynamic bearings.

According to another aspect, there is provided a gas turbine engine, comprising a bearing arrangement as described herein above.

According to another aspect, there is provided a bearing arrangement, comprising: first and second thrust bearings, disposed on a shaft and including respective first and second pressure faces; and a hydraulic connection, connecting the first and second thrust bearings and comprising a non-compressible fluid; wherein applying a shaft thrust load axially displaces the first thrust bearing so that the first pressure face exerts a force on the non-compressible fluid, and the said force causes the non-compressible fluid to be displaced between the first and second thrust bearings to exert a reaction force on the second pressure face, in order that the thrust load is shared between the first and second thrust bearings.

BRIEF DESCRIPTION OF THE DRAWINGS

Embodiments of the invention will now be described by way of example, with reference to the accompanying figures in which.

DETAILED DESCRIPTION OF EMBODIMENTS

Figure 1:
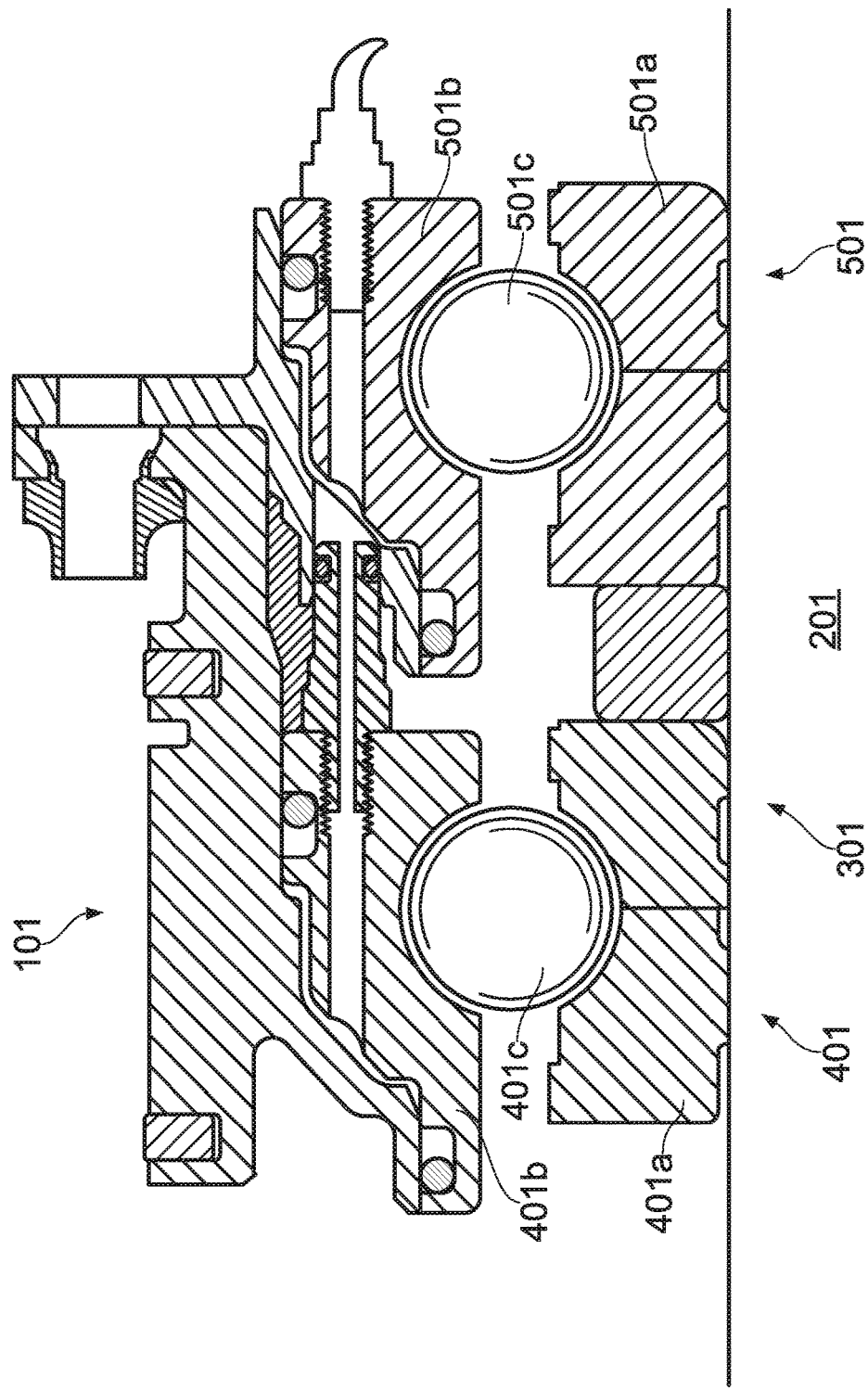
FIGS. 1 and 2 are schematic illustrations of a bearing arrangement according to the invention, in an unloaded condition.

FIG. 1 shows a half-section of a portion of a bearing housing 101 of a gas turbine engine. In this embodiment, the engine is a three-shaft gas turbine engine of an aircraft. A shaft 201 of the engine extends through the generally-annular bearing housing 101 and is supported by a location bearing arrangement 301. In this embodiment, the shaft connects a high pressure turbine and a high pressure compressor (not shown) of the engine.

In this embodiment, the location bearing arrangement 301 comprises first and second bearings 401, 501, each of which includes an inner race 401a, 501a and an outer race 401b, 501b, between which a plurality of rolling elements 401c, 501c is disposed in a cage (not shown). In this embodiment, the rolling elements 401c, 501c are balls. In this embodiment, each of the first and second bearings 401, 501 is a single-row bearing of the deep-groove type. In this embodiment, the inner races 401a, 501a and the outer races 401b, 501b comprise M50NiL steel and the rolling elements 401c, 501c comprise M50 steel.

Figure 2:
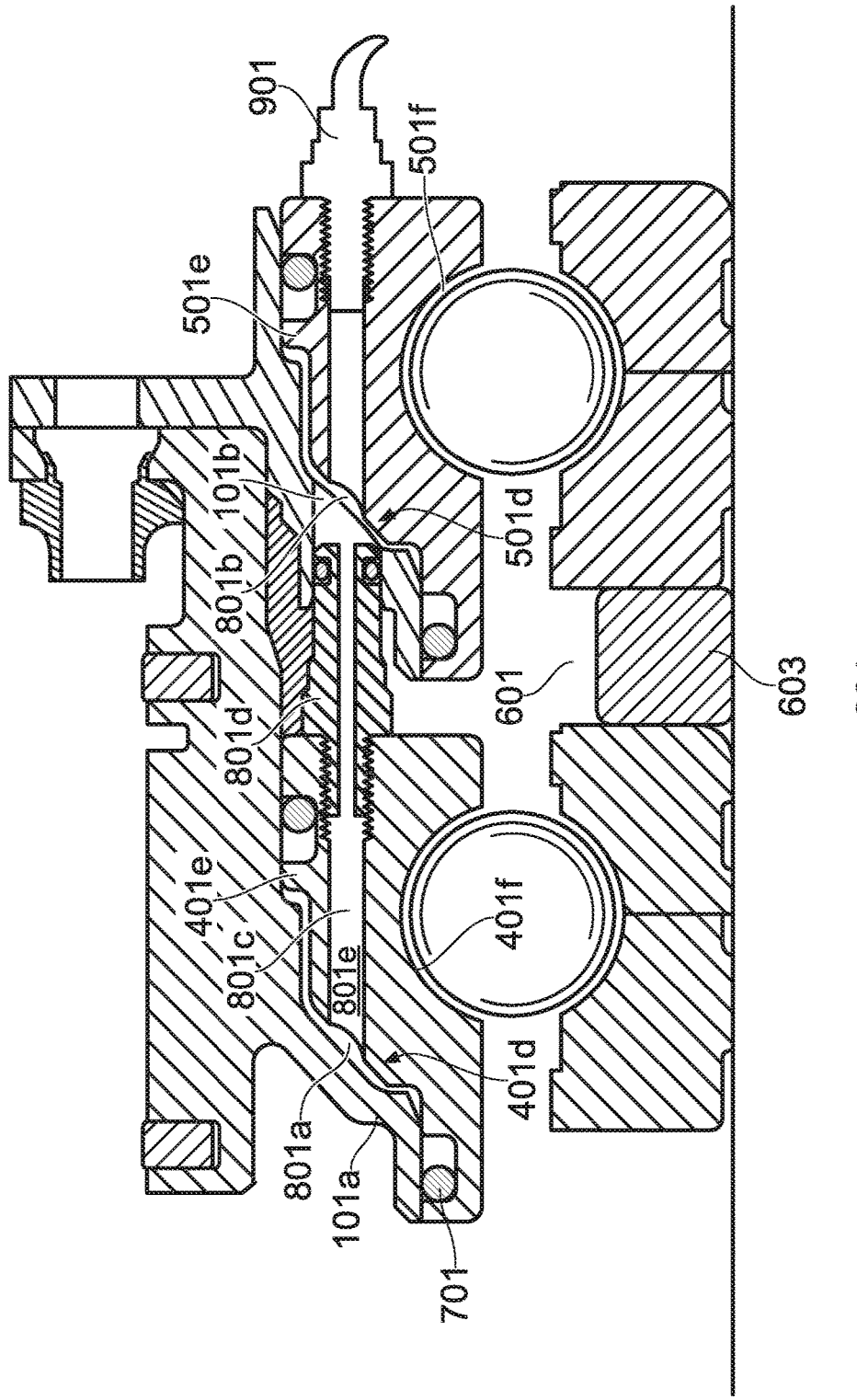

Referring now to FIG. 2, in this embodiment, the inner races 401a, 501a of the first and second bearings 401, 501 are mounted on the shaft 201 and are separated by an axial gap 601 which has an axial dimension of 5 mm. In this embodiment, a spacer 603 is disposed in the axial gap 601, as will be discussed further herein below. In this embodiment, the inner races 401a, 501a are in fixed axial relationship with one another and with the shaft 201. In this embodiment, each of the outer races 401b, 501b comprises an axial end surface, or pressure face 401d, 501d.

The outer races 401b, 501b of the first and second bearings 401, 501 are free to slide axially within the bearing housing 101. In this embodiment, seals 701 are disposed between each of the outer races 401b, 501b and the bearing housing 101. In this embodiment, the first and second bearings 401, 501 include stops 401e, 501e for limiting their axial travel relative to the bearing housing 101.

A cavity is provided between the first and second bearings 401, 501 and the inner surface of the bearing housing 101. In this embodiment, the cavity comprises a first cavity space, or chamber 801a adjacent (coincident with) the pressure surface 401d of the first bearing 401 and bounded by a first support element 101a of the bearing housing 101. The cavity further comprises a second cavity space, or chamber 801b adjacent (coincident with) the pressure surface 501d of the second bearing 501 and bounded by a second support element 101b of the bearing housing 101. In this embodiment, the first and second support elements 101a, 101b are generally cone-shaped. In this embodiment, the first and second chambers 801a, 801b are connected by a conduit, or passage 801c. In this embodiment, the passage 801c extends through the outer races 401b, 501b of the first and second bearings 401, 501, and also through an axially-movable communication duct 801d which connects the first and second chambers 801a, 801b.

The cavity contains a substantially non-compressible fluid, in this embodiment a liquid, in particular an oil 801e. The seals 701 prevent the oil 801e from escaping from the cavity. Thus the fluid-containing cavity comprises a reservoir which hydraulically connects the first and second bearings 401, 501, and in particular provides a hydraulic path between the respective first and second pressure faces 401d, 501d thereof.

In this embodiment, a portion of a pressure sensor 901 is disposed in the passage 801c such that the pressure of the oil 801e therein may be detected.

In each of the first and second bearings 401, 501 there exists a clearance gap 401f, 501f between the rolling elements 401c, 501c, and the inner race 401a, 501a and the outer race 401b, 501b. In an unloaded condition (as shown in FIGS. 1 and 2) the clearance gaps 401f, 501f provide free "play" or axial in the first and second bearings 401, 501. In this embodiment, the clearance gap 401f in the first bearing 401 has a maximum size of 1.00 mm and the clearance gap 501f in the second bearing 501 has a maximum size of 1.01 mm. That is, there is a difference of 10 microns between the clearance gaps 401f, 501f, which is caused by geometrical variations (manufacturing tolerances) in the first and second bearings 401, 501. It will be understood that in the drawings of the Figures the size of the clearance gaps 401f, 501f has been exaggerated for the sake of clarity, particularly in the radial direction.

Figure 3:
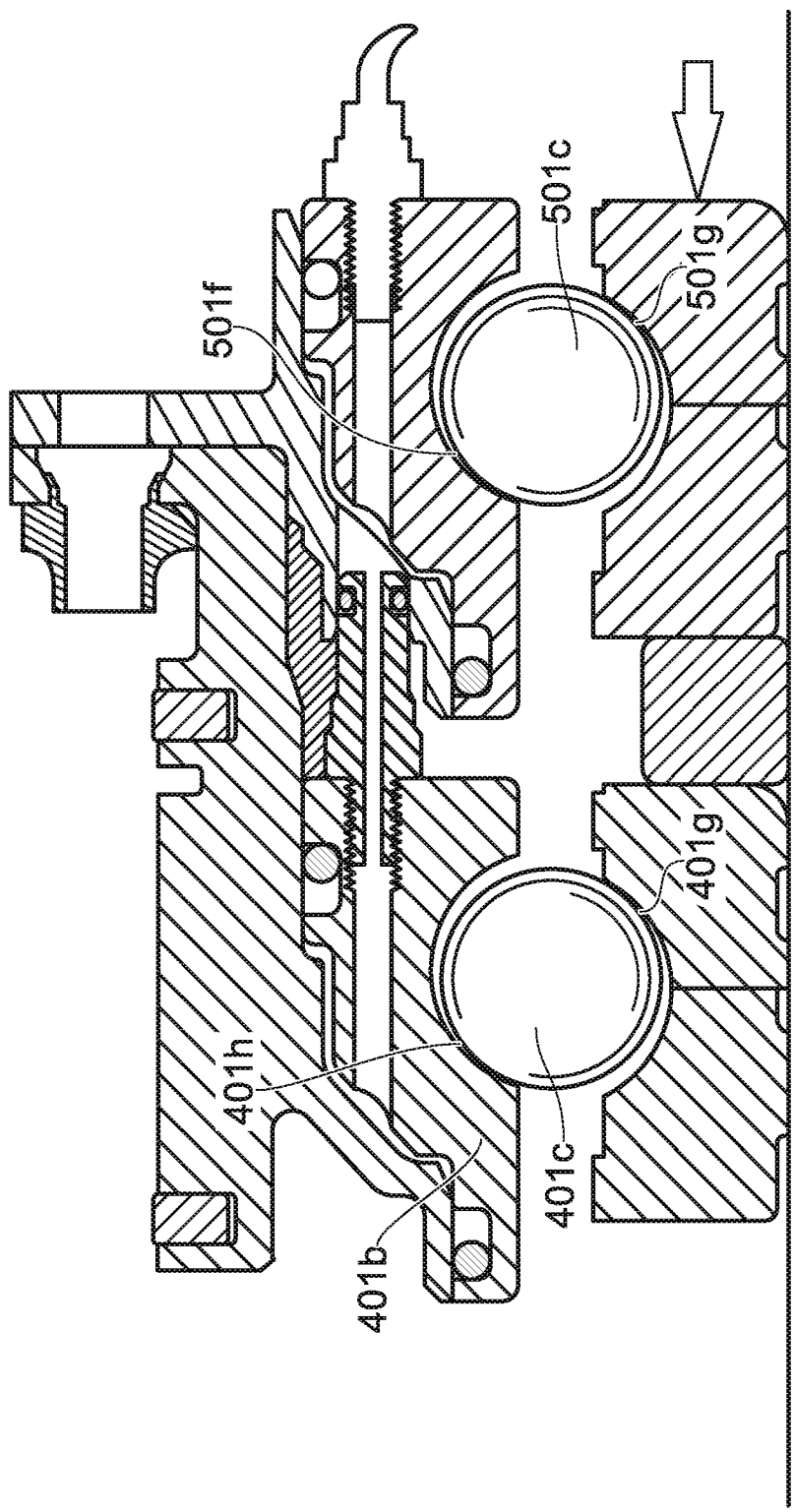
FIG. 3 shows the bearing arrangement of FIG. 1 in a part-loaded condition.

The operation of the location bearing arrangement 301 will now be described, at first with particular reference to FIG. 3. The shaft 201 is being driven by the high pressure turbine to rotate about its longitudinal axis. In addition, the shaft 201 is moving axially (from right to left as indicated by the arrow), relative to the static bearing housing 101, under a net aerodynamic force between the high pressure turbine and the high pressure compressor. As the shaft 201 slides axially the inner races 401a, 501a of the first and second bearings 401, 501 (which in this embodiment are mounted to the shaft 201 and are in fixed axial relationship therewith) come into contact with the respective rolling elements 401c, 501c at respective contact points 401g, 501g. As the shaft 201 continues to slide, in the first bearing 401 the rolling elements 401c come into contact with the outer race 401b at contact points 401h. Thus, an axial thrust load is exerted on, and transmitted through, the first bearing 401 by the shaft 201. Due to the aforementioned difference in the size of the clearance gaps 401f, 501f in the first and second bearings 401, 501, the clearance gap 501f of the second bearing 501 is not yet closed but is reduced in size (to 10 microns).

Figure 4:
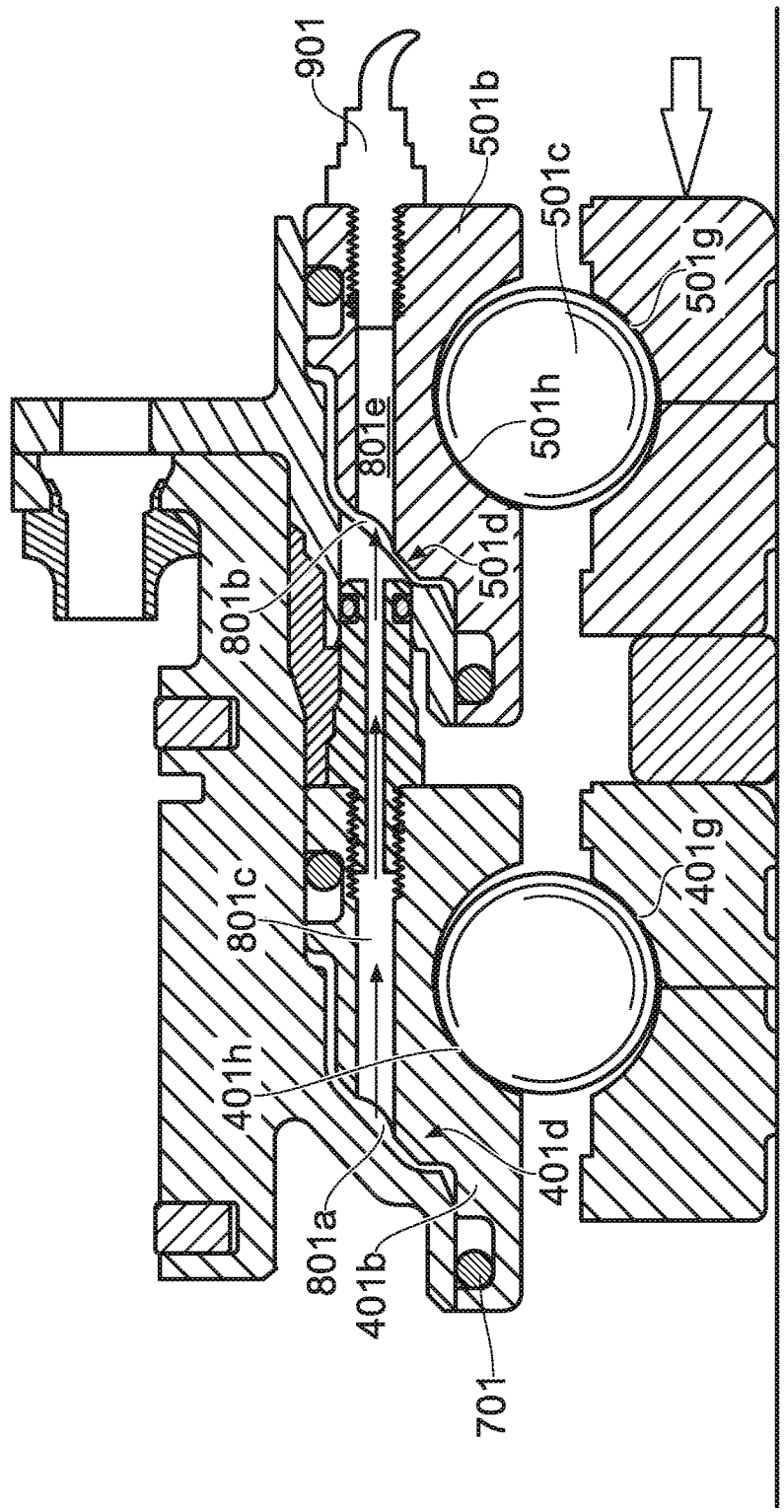
FIG. 4 shows the bearing arrangement of FIG. 1 in a loaded condition.

Referring now to FIG. 4, at a certain magnitude the force exerted at the contact points 401g, by the rolling elements 401c on the outer race 401b of the first bearing 401, is sufficient to overcome the friction resistance of the seals 701, and the outer race 401b of the first thrust bearing 401 is axially displaced along with the moving shaft 201 (leftwards as shown in FIG. 4).

At the same time, the (10 micron) clearance gap 501f in the second bearing 501 is closed as the rolling elements 501c of the second bearing 501 are brought into contact with the respective outer race 501b at contact points 501h. Thus, the axial movement of the first bearing 401 enables the second bearing 501 to take up a share of the axial thrust load imposed by the shaft 201. In this condition, the second bearing 501 may be sufficiently loaded that skidding of its rolling elements 501c may be prevented.

Still referring to FIG. 4, as the shaft 201 continues to slide (leftwards), the axial thrust load is transmitted to the oil 801e in the first chamber 801a via the pressure face 401d of the outer race 401b of the first bearing 401. Since the oil 801e is substantially non-compressible, some portion of the oil 801e is displaced, from the first chamber 801a into the second chamber 801b, via the passage 801c (from left to right in FIG. 4 as indicated by the arrows). That is, at least some of the oil 801e is transferred in the axial direction from the first bearing 401 to the second bearing 501. The displaced oil 801e exerts a reaction force, on the pressure face 501d of the outer race 501b of the second bearing 501, to increase the load on the second bearing 501. In this way, the axial thrust load is substantially equally shared between the first and second bearings 401, 501.

It will be understood that the bearing arrangement 301 will behave in the same way if the axial thrust load is applied in the opposite direction to that described herein above, i.e. from left to right in FIGS. 3 and 4.

The ability of the hydraulic connection to distribute the axial thrust load between the first and second bearings 401, 501 means that relatively large geometrical variations and/or differential expansions between the bearings 401, 501 may be tolerated. Furthermore, the provision of a non-compressible fluid means that the loads imposed on the first and second bearings 401, 501 may be conveniently and reliably derived from pressure measurements taken by the sensor 901. Knowledge of these loads can be exploited by the engine operator to better predict the service life of the bearings 401, 501, which knowledge can in turn be fed back to the design process to improve the design of the bearings 401, 501.

In the embodiment described herein above, the spacer 603, which is disposed in the axial gap 601 between the inner races 401a, 501a of the first and second bearings 401, 501, is fitted during assembly of the bearing arrangement 301, after installation on the shaft 201 of the inner race 401a of the first bearing 401 and prior to installation on the shaft 201 of the inner race 501a of the second bearing 501. The thickness T of the spacer 603 is selected to be sufficient to bring the rolling elements 401c, 501c of each of the first and second bearings 401, 501 into engagement with the respective inner races 401a, 501a at contact points 401g, 501g and the respective outer races 401b, 501b at contact points 401h, 501h. That is, the spacer 603 ensures the closure (or at least part-closure) of the clearance gaps 401f, 501f to take up the free play or axial float in the first and second bearings 401, 501, prior to the application of a significant thrust load from the shaft 201 during engine operation. In this way, the likelihood of skidding of unloaded (or lightly loaded) bearings 401, 501 may be reduced. Also, the provision of the spacer 603 may ensure that some load is maintained on the bearings 401, 501 in the event of a hydraulic failure. It will be understood that while the spacer 603 may optionally be employed to take up the free play or axial float in the first and second bearings 401, 501, the spacer 603 is not necessary for the hydraulic load share function of the bearing arrangement 301 as described herein above.

In an embodiment, each of the support elements 101a, 101b of the bearing housing 101, which bound the respective first and second chambers 801a, 801b of the cavity, comprises a flexible or resilient element, for example a diaphragm, which is arranged to be displaced or deformed under the axial thrust load imposed by the shaft 201 so that the bearings 401, 501 may be axially displaced. In this way, the bearings 401, 501 may remain loaded, and the load shared between the bearings 401, 501, even in the event of a loss of hydraulic fluid.

In an embodiment, the inner races 401a, 501a are disposed on the shaft 201 such that the first and second bearings 401, 501 are far apart. There is no particular limit to the axial spacing between the first and second thrust bearings 401, 501, other than with regard to practical tolerances and thermal expansion which will increase with distance. For example, in some embodiments the axial gap 601 has an axial dimension of anything up to about 25 mm, while in other embodiments the axial dimension exceeds 25 mm. The bearings 401, 501 could be separated such that they are in different respective bearing housings, so long as the hydraulic connection is provided between the bearings 401, 501.

In an embodiment, the inner races are made integral with the shaft, for example machined on the shaft 201. Furthermore, it will be understood that it is not essential to the load sharing function of the bearing arrangement 301 that an axial gap 603 is provided between the inner races 401a, 501a of the first and second bearings 401, 501.

While the bearing arrangement 301 described herein above comprises ball-type roller bearings, it will be understood that the invention is generally applicable to all types of bearings which take a thrust load. For example, roller bearings comprising inclined or tapered cylindrical rolling elements, and hydrostatic or hydrodynamic thrust bearings. Furthermore, it will be understood that the invention is not limited to embodiments comprising two thrust bearings but may comprise any number of thrust bearings, for example three or four thrust bearings.

In an embodiment, the pressure faces of the first and second bearings are of dissimilar surface area such that they transmit different magnitudes of force, thereby providing unequal load share between the first and second bearings. For example, the pressure faces may be differently sized in order to achieve a load share of 60:40.

While the above-described embodiment comprises a reservoir, in which a passage extends through bearing outer races to connect two chambers, it will be understood that the bearings could be hydraulically connected in various different ways, so long as a non-compressible fluid may be displaced by a load which is exerted on the fluid by the first bearing, and the fluid may exert a reaction force on the second bearing, in order that the load is shared between the first and second bearings. Furthermore, the non-compressible fluid need not be in direct contact with the respective pressure faces of the first and second bearings in order for the load to be shared between the bearings. For instance, the applied load may be transmitted to, and the reaction force may be transmitted from, the non-compressible fluid via some intermediary element, for example a spacer.

In an embodiment, the non-compressible fluid is a gel or a grease, for example a high-temperature grease.

It will be understood that the invention has been described in relation to its preferred embodiments and may be modified in many different ways without departing from the scope of the invention as defined by the accompanying claims.

Although a bearing arrangement in a three-shaft gas turbine engine has been described, the invention is equally applicable to a two-shaft or a single-shaft gas turbine engine. As will be apparent to the skilled reader, the invention is appropriate for gas turbine engines used for other purposes than to power an aircraft, for example industrial gas turbine engines or marine gas turbine engines. Furthermore, the invention is not only relevant to gas turbine engines but has wider utility. The invention is suitable for application in any rotor, for example of a type used in oil and gas drilling, where an axial load is close to or beyond the capabilities of a single bearing.

The invention claimed is:

1. A bearing arrangement comprising:
   a first thrust bearing arranged on a shaft and including a first pressure face;
   a second thrust bearing arranged on the shaft and including a second pressure face; and
   a hydraulic connection, connecting the first thrust bearing and the second thrust bearing and comprising: (i) a non-compressible fluid; (ii) a first cavity space between the first thrust bearing and a surrounding component; and (iii) a second cavity space between the second thrust bearing and the surrounding component, wherein:
   the first cavity space and the second cavity space are coincident with the first pressure face and the second pressure face, respectively, and are connected to one another by a passage that extends through an outer race of the first thrust bearing; and
   applying a shaft thrust load axially moves the first thrust bearing so that the first pressure face displaces at least a portion of the non-compressible fluid from the first cavity space to the second cavity space so as to apply a reaction force to the second pressure face, in order that the thrust load is shared between the first thrust bearing and the second thrust bearing.

2. A bearing arrangement according to claim 1, wherein the non-compressible fluid comprises a gel, a grease, or a liquid.

3. A bearing arrangement according to claim 2, wherein the non-compressible fluid comprises an oil.

4. A bearing arrangement according to claim 1, wherein the first cavity space and the second cavity space are bounded by resilient elements of the surrounding component, the resilient elements being arranged to deform to allow axial displacement of the first thrust bearing and the second thrust bearing in order to share the thrust load between the thrust bearings in the event of a failure of the hydraulic connection.

5. A bearing arrangement according to claim 1, wherein the first pressure face and the second pressure face have substantially the same surface area such that the thrust load is substantially equally shared between the first thrust bearing and the second thrust bearing.

6. A bearing arrangement according to claim 1, further comprising a sensor arranged to detect the pressure of the non-compressible fluid.

7. A bearing arrangement according to claim 1, wherein the first thrust bearing and the second thrust bearing are axially spaced on the shaft.

8. A bearing arrangement according to claim 7, further comprising a spacer element disposed between the first thrust bearing and the second thrust bearing to define the axial distance therebetween.

9. A bearing arrangement according to claim 1, wherein the first thrust bearing and the second thrust bearing are ball bearings.

* * * * *